United States Patent [19]

Murayama et al.

[11] Patent Number: 4,680,221

[45] Date of Patent: Jul. 14, 1987

[54] CHEMICAL-RESISTANT FILTER MATERIAL

[75] Inventors: Sadamitsu Murayama, Takatsuki; Makoto Tanaka, Toyonaka, both of Japan

[73] Assignee: Teijin Limited, Osaka, Japan

[21] Appl. No.: 812,319

[22] Filed: Dec. 23, 1985

[30] Foreign Application Priority Data

Dec. 25, 1984 [JP] Japan ................. 59-271843

[51] Int. Cl.$^4$ ............... B01D 39/04; B01D 39/08; B01D 39/16
[52] U.S. Cl. ................. 428/246; 210/504; 210/505; 210/508; 428/251; 428/252; 428/272; 428/273; 428/285; 428/286; 428/287; 428/289; 428/422; 428/428; 428/477.7; 428/702; 428/920

[58] Field of Search ............ 210/504, 505, 508; 428/246, 251, 252, 272, 273, 285, 286, 287, 289, 422, 702

[56] References Cited

FOREIGN PATENT DOCUMENTS 34586 9/1976 Japan .
91999 8/1977 Japan .
124414 9/1981 Japan .

OTHER PUBLICATIONS

Chemical Abstracts, 103(18): 146224, 89(10): 78244, 84(8): 49413.

*Primary Examiner*—James C. Cannon
*Attorney, Agent, or Firm*—Kenyon & Kenyon

[57] ABSTRACT

Disclosed is a chemical resistant filter material made of a fibrous structure, the fiber surface of which is coated with at least one inorganic oxide selected from oxides of silicon, aluminum and lithium, and an optional fluoropolymer resin.

14 Claims, No Drawings

CHEMICAL-RESISTANT FILTER MATERIAL

BACKGROUND OF THE INVENTION (1) Field of the Invention

The present invention relates to a filter material suitable for filtering a fluid containing an acidic substance or an alkaline substance over a long period of time.

(2) Description of the Related Art

As the filter material for a fluid containing an acidic substance or alkaline substance such as sulfur dioxide ($SO_2$), sulfur trioxide ($SO_3$), sulfuric acid ($H_2SO_4$), hydrochloric acid (HCl), ammonia ($NH_3$) or sodium hydroxide (NaOH), an inorganic fiber such as a glass fiber or asbestos fiber or a fibrous structure composed of an organic heat-resistant fiber such as an aromatic polyamide fiber, the fiber surface of which is covered with a fluoropolymer resin, a melamine resin or a mixture thereof has been mainly used at high temperatures (higher than 150° C.), and a fibrous structure composed of a chemical-resistant fiber such as an acrylic fiber has been mainly used at a low temperature (lower than 150° C.). However, when a fibrous structure of an inorganic fiber excellent in the acid resistance and alkali resistance (hereinafter referred to as "chemical resistance") is used as the filter material, since the flexural property is poor, the filter material is seriously damaged when dusts are shaked down or brushed off, and hence, the life is short. Moreover, it has been recently pointed out that a bad influence is given to a human body when a worker is engaged with the production over a long period of time, and this becomes a great social problem.

Fibrous structures comprising an organic heat-resistant fiber such as an aromatic polyamide fiber, the surface of which is covered with a fluoropolymer resin, a melamine resin or a mixture thereof, are disclosed, for example, in Japanese Examined Patent Publication No. 51-34586 and Japanese Unexamined Patent Publication No. 56-124414. A fibrous structure composed of a chemical-resistant fiber material such as an acrylic fiber is satisfactory in the flexural durability and handling property and has a considerably good chemical resistance. For example, a filter material of this type has been proved to be applicable to filtering of dusts in an acidic gas atmosphere having an $SO_x$ concentration of 50 to 100 ppm and has been practically used for this purpose. From the resource-saving viewpoint, conversion of low-sulfur-content heavy oil to high-sulfur-content heavy oil or coal as the fuel has been advanced at a high pitch, and it is required to filter an acidic gas having an $SO_x$ concentration higher than several hundred ppm in a waste gas at a temperature higher than 150° C. Accordingly, development of a filter material having a high chemical resistance and a high heat resistance in combination is eagerly desired. An organic chemical-resistant fibrous structure heretofore used is insufficient, and for the above-mentioned purpose a fibrous structure composed of a glass fiber is used.

SUMMARY OF THE INVENTION

In view of the foregoing, it is a primary object of the present invention to provide a filter material comprising a fibrous structure having enhanced chemical resistance, heat-resistance and flexural durability.

In accordance with the present invention, there is provided a chemical-resistant filter material comprising a fibrous structure, the fiber surface of which is coated with at least one compound selected from the group consisting of oxides of silicon, aluminum and lithium.

DESCRIPTION OF THE PREFERRED EMBODIMENTS

The fibrous structure includes an ordinary woven or knitted fabric, a nonwoven fabric and a composite of a woven or knitted fabric and a nonwoven fabric, and the fibrous structure is designed to have strength, creep characteristics and filtering characteristics necessary for a filter material.

The fibrous structure may be composed of any fibers. For example, ordinary organic polymer fibers such as an acrylic fiber and a polyester fiber may be used. However, in the case where an especially high heat resistance is desired, it is preferable to use inorganic fibers such as a glass fiber and heat-resistant organic polymer fibers such as an aromatic polyamide fiber.

An aromatic polyamide fiber is most preferable. By the term "aromatic polyamide fiber" used herein is meant an aromatic polyamide having recurring units represented substantially by —NH—Ar—NH—CO—Ar'—CO— or —NH—Ar—CO(wherein Ar and Ar', which may be the same or different, represent an aromatic ring). For example, there can be mentioned a polycondensate of metaphenylene diamine with isophthaloyl chloride, a polycondensate of paraphenylene diamine with terephthaloyl chloride and a copolymer formed by copolycondensing metaphenylene diamine and paraphenylene diamine with isophthaloyl chloride and terephthaloyl chloride. Furthermore,

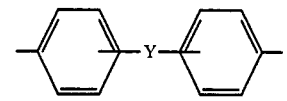

(Y represents —O—, —$SO_2$— or —$CH_2$—) may be incorporated as a copolymer component as Ar or Ar'.

The oxides of silicon, aluminum and lithium used for coating the fiber surface of the fibrous structure include $SiO_2$, $Al_2O_3$ and $Li_2O$.

Any of known methods can be adopted for coating the fiber surface of the fibrous structure with at least one compound selected from oxides of silicon, aluminum and lithium. From the viewpoint of the handling property and processability, it is preferable to adopt a method in which a so-called colloidal solution which comprises ultrafine particles of the above-mentioned inorganic oxide having a size smaller than 1 μm, dispersed in water in the colloidal form of an electric double layer is applied to the fibrous structure. It is preferable that the colloidal solution contains at least 8% by weight, more preferably at least 15% by weight, of the inorganic oxide. The amount of the silicon, aluminum or lithium oxide coated on the fibrous structure is 2 to 40% by weight, preferably 5 to 30% by weight, as the solid. If the amount of the inorganic oxide is smaller than 2% by weight, no desirable acid resistance can be obtained. If the amount of the inorganic oxide exceeds 40% by weight, the fibrous structure becomes too hard, and the sewing property or dust-dropping property is degraded. In addition, the filter material has a poor permeability and it becomes difficult to shake down or brush off dusts.

It is preferable to coat the fiber surface of the fibrous structure with a fluoropolymer resin together with the above-mentioned inorganic oxide. The filter material made of the fluoropolymer resin-coated fibrous structure has a soft touch and the coated fibrous structure is easy to sew into the filter material.

As the fluoropolymer resin, there can be mentioned a polymer of an acrylate or methacrylate known as a polyfluoroalkyl group-containing water- and oil-repellant, which is represented by the general formula of $CH_2=C(R')COO(R)_mRf$ (in which Rf represents a linear or branched perfluoroalkyl group having 3 to 20 carbon atoms, R' represents a hydrogen atom or a methyl group, R represents a linear or branched divalent alkylene group having 1 to 10 carbon atoms, and m is 0 or 1), a copolymer of this acrylate or methacrylate with a compound not containing a polyfluoroalkyl group, such as acrylic acid, methacrylic acid, an alkyl acrylate, alkyl methacrylate, acrylamide, methacrylamide, an N-methylolated product of acrylamide or methacrylamide, or vinyl acetate; and a copolymer of the above-mentioned acrylate or methacrylate with two or more of the foregoing monomers. The fluoropolymer resin also includes fluoroplastics and fluororubbers comprising a polymer or copolymer having fluorine atoms bonded to the main chain or carbon atoms. As specific examples, there can be mentioned polymers of tetrafluoroethylene, chlorotrifluoroethylene, vinylidene fluoride, tetrafluoroethylene, chlorotrifluoroethylene, hexafluoropropylene and perfluoroalkyl fluorovinyl ether; copolymers of vinyl fluoride with tetrafluoroethylene, chlorotrifluoroethylene, hexafluoropropylene and perfluoroalkyl vinyl ether; and copolymers of tetrafluoroethylene with chlorotrifluoroethylene, hexafluoropropylene and perfluoroalkyl fluorovinyl ether. A mixture of two or more of these fluoropolymers may be used.

Any of known methods can be adopted for coating the fiber surface of the fibrous structure with the fluoropolymer resin, but there are preferably adopted a method in which an aqueous dispersion formed by dispersing the fluoropolymer resin in water by using a dispersant or an aqueous emulsion formed by emulsifying the fluoropolymer resin in water by using an emulsifier is coated on the fibrous structure, and a method in which a solution of the fluoropolymer resin in an organic solvent is coated on the fibrous structure. The amount of the fluoropolymer resin applied to the fibrous structure is 0.1 to 20% by weight, preferably 0.3 to 15% by weight, as the solid. If the amount of the fluoropolymer resin is smaller than 0.1% by weight, a flexibility required for the filter material cannot be obtained. If the amount of the fluoropolymer resin exceeds 20% by weight, the touch is degraded.

For coating the fiber surface of the fibrous structure with the fluoropolymer resin and at least one compound selected from oxides of silicon, aluminum and lithium, there may be adopted a method in which a mixture of the inorganic oxide and the fluoropolymer resin is applied. However, in view of the chemical resistance and flexibility of the filter material, there is preferably adopted a method in which the inorganic oxide is first coated and the fluoropolymer resin is then coated. A conventional method may be adopted for applying a colloidal solution of at least one compound selected from oxides of silicon, aluminum and lithium. For example, an impregnation method, a coating method and a spraying method may be adopted. After a predetermined amount of the colloidal solution is applied to the fibrous structure according to such a method, the fibrous structure is dried at a temperature higher than 80° C. by an ordinary optional drier such as a non-touch drier or a tenter. In order to increase the fixing property to the fiber, it is preferred that the heat treatment be carried out at a temperature of at least 200° C. after the drying. A customary method may be adopted for applying the fluorine type resin to the fibrous structure. For example, there may be adopted an impregnation method using an organic solvent solution of the fluoropolymer resin or an aqueous emulsion or dispersion of the fluoropolymer resin, a coating method and a spraying method. After a predetermined amount of the fluoropolymer resin is applied to the fibrous structure according to such a method, the fibrous structure is dried at a temperature of at least 80° C. In order to increase the fixing property of the fluoropolymer resin to the fibrous structure, it is preferred that a heat treatment be carried out at a tempeature of at least 150° C. after the drying. The heat treatment temperature various depending upon the kind of the fluoropolymer resin used. A high temperature not causing thermal deterioration of the fluoropolymer resin is preferable. It is preferred that the heat treatment temperature be 150° to 220° C. in the case of a fluoroalkyl acrylate polymer having fluorine atoms bonded to the side chain or 200° to 370° C. in the case of a fluoropolymer resin having fluorine atoms bonded to the main chain.

When at least one compound selected from oxides of silicon, aluminum and lithium and the fluoropolymer resin are simultaneously applied, the colloidal solution of the inorganic oxide is mixed with a predetermined amount of an aqueous dispersion or emulsion of the fluoropolymer resin compatible with the colloidal solution, that is, not causing the destruction of the latex, the mixture is applied to the fibrous structure, the fibrous structure is dried at a temperature of at least 80° C. and the heat treatment is carried out preferably at a temperature of at least 200° C.

When at least one compound selected from oxides of silicon, aluminum and lithium is applied to the fibrous structure, in order to fix the compound tightly to the fibrous structure, it is preferred that a heat-resistant resin such as a melamine resin, an acrylic resin or a silicone resin be used in combination with the inorganic oxide.

According to the present invention, since the fibrous structure is coated with at least one compound selected from oxides of silicon, aluminum and lithium, there can be provided a filter material having excellent heat resistance, chemical resistance, flexural durability and dust-collecting property, and this filter material has a capability of filtering a fluid containing acidic or alkaline substances at a high temperature for a long time. When a fluoropolymer resin is used in addition to the inorganic oxide as a coating material, there can be provided a filter material having an enhanced flexibility as well as these excellent properties. Accordingly, the filter material can be effectively used for filtering various high-concentration acidic and alkaline gases formed from various burners (for combustion of heavy oil and coal), melting furnaces (blast furnaces), converters (combustion furnaces), open hearth furnaces, roasting furnaces, sintering furnaces, drying furnaces, cement calcining furnaces and waste incineration furnaces and industrial waste waters containing acids or alkalis at a high efficiency for a long time.

The present invention will now be described in detail with reference to the following examples. In the examples, the stiffness of the fabric was measured according to the cantilever method in the case of a woven fabric or the Gurley method in the case of a felt (each method being carried out according to JIS L-1096). The acid resistance of the fabric was determined according to the acid resistance evaluation methods (I) and (II) described below. The measurement methods are described below.

Stiffness (cantilever method)

Five specimens having a width of 2 cm and a length of 15 cm were cut from each of the warp and filling directions of the fabric. Each specimen was placed on a horizontal platform having a smooth surface and one end inclined at 45 deg, and one end of the specimen was precisely registered with the inclined end of the horizontal stand and the position of the other end of the specimen was read by a scale. Then, the specimen was gently slid toward the inclined face and when the central point of one end of the specimen fell in contact with the inclined face, the position (mm) of the other end was read by the scale. The stiffness was expressed by the length of the movement of the specimen. The measurement was made on both the front and back sides of each of the five specimens, and the average value in the warp and filling directions was calculated (to the integer order).

Flexural rigidity (Gurley method)

Five strip specimens having a length of L cm and a width of d cm were cut from each of the warp and filling directions of the fabric. Each specimen was attached to a chuck of a Gurley tester and the chuck was secured so that the dial of a movable arm was set at L/2.54. Appropriate loads Wa (g), Wb (g) and Wc (g) were placed on load-attaching holes (a, b and c) located below the fulcrum of a pendulum. The movable arm was rotated at a constant speed and the scale RG was read when the specimen separated from the pendulum. The flexural rigidity was determined according to the following equation. The measurement of the flexural rigidity S was made on the front and back sides of each of the five specimens and the average value in the warp and filling directions was calculated (down to the first decimal point).

Flexural rigidity $$S = RG \times (aWa + bWb + cWc) \times \frac{L^2}{d} \times 0.306$$

wherein a, b and c are distances (cm) of the load-attaching holes from the fulcrum.

Acid resistance evaluation method (I)

A sample (woven fabric or felt) was immersed in an aqueous solution of sulfuric acid having a concentration of 7% by weight and heat-treated at 150° C. for 1 hour (first treatment). Then, the sample was immersed in the same aqueous solution of sulfuric acid having a concentration of 7% by weight and heat-treated at 150° C. for 2 hours (second treatment). The second treatment was repeated and the strength retention ratio of the sample was measured when the amount of the sulfate group accumulated in the treated sample reached 10% by weight, 20% by weight or 30% by weight. The ratio of accumulation of the sulfate group in the sample was calculated according to the following formula, and the strength retention ratio was expressed by the ratio of the strength of the sample after the sulfuric acid treatment to the strength of the sample before the sulfuric acid treatment.

Accumulation ratio of sulfate group in sample =

$$\frac{W - W_0}{W_0} \times 100 \, (\%)$$

wherein $W_0$ is the weight of the sample before the sulfuric acid treatment and W is the weight of the sample after the sulfuric acid treatment.

Acid resistance evaluation method (II)

A sample was cut into a strip specimen having a width of 1 cm and a length of 15 cm, and a load of 1 kg was hung down from one end in the length direction, and the sample was suspended in an aqueous soluton of sulfuric acid having a concentration of 98% by weight at a temperature of 30° C. while the other end was secured in air. The time required for breakage of the sample (hereinafter referred to as "cutting time") was measured.

Examples 1 through 7 and Comparative Examples 1 through 4

A woven fabric and a nonwoven sheet-like structure (i.e., a felt), both having a weight of about 330 g/m², were made from a polymetaphenylene isophthalamide fiber. The woven fabric and the nonwoven fabric were treated with the inorganic colloidal solution or the organic resin, shown in Table 1, by a padding procedure. The treated fabrics were then dried and cured.

The treating conditions and the test results are shown in Table 1.

TABLE 1

| | Fibrous structure*2 | Inorganic colloidal solution | | Drying Temp. (°C.) | Drying Time (min) | Curing Temp. (°C.) | Curing Time (min) | Amount of inorganic oxide deposited / Weight of fabric × 100 (%) | Strength retention ratio (%) | | |
|---|---|---|---|---|---|---|---|---|---|---|---|
| | | | | | | | | | 10% | 20% | 30% |
| Example 1 | Woven fabric | Colloidal silica | (20.3% aq. soln.) | 110 | 15 | 160 | 3 | 16.2 | 85.5 | 46.2 | 41.5 |
| Example 2 | Woven fabric | Lithium silicate SiO₂ content Li₂O content | (26.5% aq. soln.) 20% 6.5% | " | " | " | " | 18.6 | 84.6 | 45.8 | 40.3 |
| Example 3 | Woven fabric | Colloidal alumina | (22.0% aq. soln.) | " | " | " | " | 17.6 | 100 | 92.0 | 88.3 |
| Example 4 | Woven fabric | Colloidal alumina | (22.0% aq. soln.) | " | " | 190 | 3 | 17.5 | 100 | 98.2 | 92.4 |
| Example 5 | Woven fabric | Colloidal alumina | (22.0% aq. soln.) | " | " | — | — | 18.0 | 100 | 90.2 | 86.4 |
| Example 6 | Woven fabric | Colloidal alumina | (11.0% aq. soln.) | " | " | 160 | 3 | 8.8 | 98.6 | 82.6 | 62.5 |

TABLE 1-continued

| | Fibrous structure[*2] | Inorganic colloidal solution | | Drying Temp. (°C.) | Time (min) | Curing Temp. (°C.) | Time (min) | Amount of inorganic oxide deposited / Weight of fabric × 100 (%) | Strength retention ratio (%) 10% | 20% | 30% |
|---|---|---|---|---|---|---|---|---|---|---|---|
| Example 7 | Felt | Colloidal alumina | (22.0% aq. soln.) | 110 | 30 | 160 | 3 | 37.4 | 100 | 100 | 95.5 |
| Comparative Example 1 | Woven Fabric | Organic resins[*1] | 10.55% aq. soln.) | 120 | 10 | 165 | 5 | 13.7 | 83.5 | 45.4 | 35.9 |
| Comparative Example 2 | Felt | Organic resins[*1] | 10.55% aq. soln.) | 120 | 30 | 165 | 5 | 17.3 | 96.8 | 48.5 | 23.6 |
| Comparative Example 3 | Woven fabric | Not treated | | — | — | — | — | — | 40.2 | 21.2 | 14.3 |
| Comparative Example 4 | Felt | Not treated | | — | — | — | — | — | 66.0 | 25.6 | 11.9 |

[*1]Conventional organic resin Acrylamide resin Urea-formaldehyde resin Fluoropolymer resin
[*2]Made of polymetaphenylene terephthalamide Comparison of the thermal deterioration of the filter materials of the present invention (Examples 3 and 4) with that of the conventional filter materials (Comparative Examples 1 and 3) was carried out as follows. When the amount of the sulfate group accumulated in each sample reached 10% by weight or 20% by weight, the sample was subjected to a dry heat treatment at 200° C. for 48 hours. The strength retention ratio was determined before and after the dry heat treatment. The results are shown in Table 2.

TABLE 2

| Sample | Strength retention ratio before dry heat treatment (%) 10% | 20% | Strength retention ratio after dry heat treatment (%) 10% | 20% |
|---|---|---|---|---|
| Example 3 | 100 | 92 | 100 | 91.2 |
| Example 4 | 100 | 98.2 | 100 | 98.4 |
| Comparative Example 1 | 83.5 | 45.2 | 75.2 | 31.8 |
| Comparative Example 3 | 40.2 | 21.2 | 38.1 | 14.8 |

Examples 8 through 11 and Comparative Examples 5 through 7

Woven fabrics having a weight of about 330 g/m² were made from a polyester spun yarn, a polyacrylonitrile spun yarn and an E-glass fiber bulk yarn (taslan-treated). Following substantially the same procedures as described in Examples 1 through 7, the woven fabrics were treated with inorganic oxide colloidal solutions, and dried. Some of the dried fabrics were cured. The treating conditions are shown in Table 3.

The strength retention ratio of the treated fabrics was similarly determined wherein the heat-treatment of the polyester fiber fabric and the polyacrylonitrile fiber fabric was carried at 140° C., the heat treatment of the glass fiber fabric was carried out at 150° C. and the strength retention ratio was determined when the amount of the sulfate group accumulated in each fabric reached 5%, 10% or 15% by weight. The test results are shown in Table 3.

For comparison, the above-mentioned fabrics were subjected to the test for the strength retention ratio without the inorganic oxide treatment. The testing conditions and test results are shown in Table 3.

TABLE 3

| | Fiber for woven fabric | Inorganic colloidal solution | Drying Temp. (°C.) | Time (min) | Curing Temp. (°C.) | Time (min) | Amount of inorganic oxide deposited / Weight of fabric × 100 (%) | Strength retention ratio (%) 5% | 10% | 15% |
|---|---|---|---|---|---|---|---|---|---|---|
| Example 8 | Polyester fiber | Colloidal alumina (22.0% aq. soln.) | 110 | 15 | 140 | 3 | 13.2 | 100 | 96.5 | 30.4 |
| Example 9 | Polyacrylonitrile fiber | Colloidal alumina (22.0% aq. soln.) | " | " | " | " | 17.6 | 100 | 100 | 98.3 |
| Example 10 | E-glass fiber | Colloidal alumina (22.0% aq. soln.) | " | " | — | — | 7.7 | 100 | 100 | 100 |
| Example 11 | E-glass fiber | Colloidal silica (20.3% aq. soln.) | " | " | — | — | 7.1 | 100 | 100 | 96.5 |
| Comparative Example 5 | Polyester fiber | Not treated | — | — | — | — | — | 4.2 | 2.1 | — |
| Comparative Example 6 | Polyacrylonitrile fiber | — | — | — | — | — | — | 80.5 | 71.8 | 54.8 |
| Comparative Example 7 | E-glass fiber | — | — | — | — | — | — | 100 | 100 | 89.7 |

Examples 12 through 21, Comparative Examples 8 and 9

A 5-sheet satin weave fabric having a warp density of 79 yarns/inch and a weft density of 52 yarns/inch was formed by using two-folded yarns of count No. 20 spun from a polymetaphenylene isophthalamide fiber having a single filament fineness of 2 denier and a length of 51 mm. The fabric was heat-set at 190° C. to obtain a woven fabric (A) (having a weight of 323 g/m²). A plain weave fabric (B) having a warp density of 32 yarns/inch and a weft density of 32 yarns/inch was formed by using two-folded yarns of count No. 20 spun from a polymetaphenylene isophthalamide fiber having a single filament fineness of 2 denier and a length of 51 mm. A laminate having a basis weight of 450 g/m² [hereinafter referred to as "felt (A)"] was formed by needle-punching a web formed by passing a polymetaphenylene isophthalamide fiber having a single filament fineness of 2 denier and a length of 71 mm through a beater and a carding machine to the fabric (B) as the substrate. The fabric (A) or felt (A) was impregnated with an inorganic colloidal solution having a predetermined concentration as shown in Table 4 and squeezed by a mangle, and the fabric or felt was dried and heat-treated at a predetermined temperature for a predetermined time. Then, the treated fabric was impregnated with an aqueous dispersion of a fluoropolymer resin having a predetermined concentration as shown in Table 4 and squeezed by a mangle, and the fabric was dried and heat-treated at a predetermined temperature for a predetermined time.

For comparison, the stiffness and acid resistance of the samples (Examples 13, 15, 17, 19 and 21) which were treated only with the inorganic colloidal solution but not treated with the fluoropolymer resin are shown in Table 4.

As is apparent from the data shown in Table 1, the stiffness of the fabrics in Examples 12, 14, 16, 18 and 20 was lower than that of the fabrics treated only with the inorganic colloidal solution. The fabrics in Examples 12, 14, 16, 18 and 20 could be sewn under substantially the same conditions as adopted for the untreated fabric. Moreover, the handling property was not substantially different from that of the untreated fabric, and the acid resistance of the fabrics in Examples 12, 14, 16, 18 and 20 was very good as measured by either the method (I) or the method (II). On the other hand, the fabrics in Examples 13, 15, 17, 19 and 21 had a good acid resistance at the method (I), but had no good acid resistance at the method (II) and the stiffness was high. Moreover, when a filter cloth was sewn from the fabrics in the latter Examples, the sewing speed could not be increased and the handling property was poor.

TABLE 4

| | Fabric | Inorganic colloidal solution (concentration) | Drying temp. time | Heat treatment temp. & time | Amount of inorganic oxide deposited*1 | Aq. dispersion of fluoropolymer resin (concentration) | Heat treatment temp. & time | Amount of fluoropolymer resin deposited*2 | Stiffness of treated fabric Cantilever method (mm) | Stiffness of treated fabric Gurley method (mgf) {N} | Acid resistance evaluation method (I) Strength retention ratio (%) 10% | 20% | 30% | Acid resistance evaluation method (II) Breaking time (min.) |
|---|---|---|---|---|---|---|---|---|---|---|---|---|---|---|
| Example 12 | Woven fabric (A) | Colloidal silica (20.3%) | 110° C. 15 min. | 250° C. 3 min. | 16.0% | Polytetrafluoroethylene (2.0%) | 340° C. 5 min. | 1.2% | 7.1 | — | 90.0 | 68.3 | 55.4 | 11 |
| Example 13 | Woven fabric (A) | Colloidal silica (20.3%) | 110° C. 15 min. | 250° C. 3 min. | " | Not treated | — | — | 9.1 | — | 86.5 | 47.0 | 42.3 | 5 |
| Example 14 | Woven fabric (A) | Lithium silicate (26.5%) SiO2 content 20% Li2O content 6.5% | 110° C. 15 min. | 250° C. 3 min. | 18.0% | Polytetrafluoroethylene (2.0%) | 340° C. 5 min. | 1.3% | 7.5 | — | 86.3 | 61.5 | 52.4 | 9 |
| Example 15 | Woven fabric (A) | Lithium silicate (26.5%) SiO2 content 20% Li2O content 6.5% | 110° C. 15 min. | 250° C. 3 min. | " | Not treated | — | — | 10.1 | — | 85.3 | 46.3 | 41.0 | 4 |
| Example 16 | Woven fabric (A) | Colloidal alumina (22.0%) | 110° C. 15 min. | 250° C. 3 min. | 17.3% | Polytetrafluoroethylene (2.0%) | 340° C. 5 min. | 1.1% | 7.2 | — | 100 | 97 | 93 | 14 |
| Example 17 | Woven fabric (A) | Colloidal alumina (22.0%) | 110° C. 15 min. | 250° C. 3 min. | " | Not treated | — | — | 9.5 | — | 100 | 93.0 | 89.5 | 6.5 |
| Example 18 | Felt (A) | Colloidal alumina (22.0%) | 110° C. 15 min. | 250° C. 3 min. | 37.0% | Polytetrafluoroethylene (2.0%) | 290° C. 5 min. | 2.2% | — | 11.1 | 100 | 100 | 98.5 | 240 |
| Example 19 | Felt (A) | Colloidal alumina (22.0%) | 110° C. 15 min. | 250° C. 3 min. | " | Not treated | — | — | — | 18.4 | 100 | 100 | 96.0 | 1.0 |
| Example 22 | Woven fabric (A) | Colloidal alumina (10.0%) | 160° C. 2 min. | 280° C. 2 min. | 18.6% | Tetrafluoroethylene/hexafluoropropylene copolymer (1.0%) | 160° C. 2 min. | 0.6% | — | 5.1 | 100 | 98 | 95.4 | 220 |
| Example 21 | Woven (A) | Colloidal alumina (10.0%) | 160° C. 2 min. | 280° C. 2 min. | " | Not treated | — | — | — | 12.5 | 100 | 90.0 | 85.0 | 0.5 |
| Comparative Example 8 | Woven fabric (A) | Not treated | — | — | — | — | — | — | 5.0 | — | 40.2 | 21.1 | 14.3 | 1.0 |
| Comparative Example 9 | Felt (A) | Not treated | — | — | — | — | — | — | — | 2.1 | 66.0 | 25.6 | 11.9 | 0.1 |

Note
*1 $\frac{\text{Weight of applied inorganic oxide}}{\text{Weight of woven fabric or felt before application of inorganic oxide}} \times 100$

*2 $\frac{\text{Weight of applied fluoropolymer resin}}{\text{Weight of inorganic oxide applied woven fabric or felt}} \times 100$

Examples 22 through 27

Following the procedure described in Example 12, the woven fabric (A) (used in Example 12) and the felt (A) (used in Example 18) were treated wherein the fluoropolymer resins and the treating conditions shown in Table 5 were used. The results are shown in Table 5.

ing a web formed by passing a fiber of the above-mentioned aromatic polyether amide having a single filament fineness of 1.5 denier and a fiber length of 51 mm through an ordinary beater and a carding machine to the above plain weave fabric as the base fabric. The felt (B) was resintreated in the same manner as described in Example 12. The properties of the resin-treated sample and the untreated sample are shown in Table 6.

TABLE 5

| | Fabric | Inorganic colloidal solution (concentration) | Drying temp. & time | Heat treatment temp. & time | Amount of inorganic oxide deposited (%) | Aq. dispersion of fluoropolymer resin (concentration) |
|---|---|---|---|---|---|---|
| Example 22 | Woven fabric (A) | Colloidal alumina (10.0%) | 160° C. 2 min. | 280° C. 2 min. | 7.0% | Tetrafluoroethylene/hexafluoropropylene copolymer (1.0%) |
| Example 23 | Woven fabric (A) | Colloidal alumina (20.0%) | 160° C. 2 min. | 220° C. 4 min. | 14.2 | Tetrafluoroethylene/hexafluoropropylene copolymer (2.0%) |
| Example 24 | Felt (A) | Colloidal alumina (10.0%) | 160° C. 5 min. | 250° C. 2 min. | 15.0 | Tetrafluoroethylene/hexafluoropropylene copolymer (2.0%) |
| Example 25 | Felt (A) | Colloidal alumina (10.0%) | 160° C. 5 min. | 250° C. 2 min. | 15.0 | Polychlorotrifluoroethylene (1.0%) |
| Example 26 | Felt (A) | Colloidal alumina (10.0%) | 160° C. 5 min. | 250° C. 2 min. | 15.0 | Vinyl fluoroide/hexafluoropropylene (2.0%) . |
| Example 27 | Felt (A) | Colloidal alumina (10.0%) | 160° C. 5 min. | 250° C. 2 min. | 15.0 | Perfluoroalkyl acrylate polymer* (3.0%) |

| | Drying temp. & time | Heat treatmemt temp. & time | Amount of fluoropolymer resin | Stiffness of treated fabric | | Acid resistance evaluation method (I) | | | Acid resistance evaluation method (II) |
|---|---|---|---|---|---|---|---|---|---|
| | | | | Cantilever method (mm) | Gurley method (mgf) {N} | Strength retention ratio (%) | | | Breaking time (min.) |
| | | | | | | 10% | 20% | 30% | |
| Example 22 | 160° C. 1 min. | 290° C. 5 min. | 0.7% | 5.2 | — | 100% | 95% | 91% | 11 |
| Example 23 | 160° C. 1 min. | 340° C. 2 min. | 1.3 | 6.9 | — | 100 | 96 | 94 | 17 |
| Example 24 | 160° C. 5 min. | 340° C. 5 min. | 2.4 | — | 5.3 | 100 | 99 | 97 | 360 |
| Example 25 | 160° C. 5 min. | 340° C. 5 min. | 1.1 | — | 5.2 | 100 | 90 | 85 | 110 |
| Example 26 | 160° C. 5 min. | 290° C. 5 min. | 1.3 | — | 4.8 | 100 | 92 | 87 | 125 |
| Example 27 | 160° C. 5 min. | 190° C. 5 min. | 3.7 | — | 4.5 | 100 | 91 | 85 | 8 |

Example 28 and Comparative Example 10

A plain weave fabric having a weft density of 13 yarns/inch and a warp density of 13 yarns/inch was formed from a 1500-denier and 1000-filament aromatic polyether amide filamentary yarn obtained by wet-spinning a polymer synthesized from 25 mole % of paraphenylene diamine, 50 mole % of terephthaloyl dichloride and 25 mole % of 3,4'-diaminodiphenyl ether. A laminate having a basis weight of 450 g/m² [hereinafter referred to as "felt (B)"] was obtained by needle-punch-

Example 27

A plain weave fabric (C) having a warp density of 31 yarns/inch and a weft density of 31 yarns/inch was formed from a 666-filament polyparaphenylene terephthalamide filamentary fiber having a total fineness of 1000 denier (Kevler 29 ® supplied by Du Pont). The plain weave fabric (C) was treated in the same manner as described in Example 12. The properties of the treated fabric are shown in Table 6.

TABLE 6

| | Fabric | Inorganic colloidal solution (concentration) | Drying temp. & time | Heat treatment temp. & time | Amount of inorganic oxide deposited | Aq. dispersion of fluoropolymer resin (concentration) |
|---|---|---|---|---|---|---|
| Example 28 | Felt (B) | Colloidal alumina (10%) | 160° C. 5 min. | 280° C. 2 min. | 13% | Polytetrafluoroethylene (2%) |
| Comparative Example 10 | Felt (B) | Not treated | — | — | — | — |
| Example 29 | Woven fabric (C) | Colloidal alumina (20%) | 160° C. 5 min. | 250° C. 2 min. | 14% | Tetrafluoroethylene/hexafluoropropylene copolymer (4%) |

| | Drying temp. & time | Heat treatment temp. & time | Amount of fluoropolymer resin deposited | Stiffness of treated fabric | | Acid resistance evaluation method (I) | | | Acid resistance evaluation method (II) |
|---|---|---|---|---|---|---|---|---|---|
| | | | | Cantilever method (mm) | Gurley method (mgf) {N} | Strength retention ratio (%) | | | Breaking time (min.) |
| | | | | | | 10% | 20% | 30% | |
| Example 28 | 160° C. | 340° C. | 2.0% | — | 6.4 | 98% | 91% | 73% | 98 |

TABLE 6-continued

|  | 5 min. | 5 min. |  |  |  |  |  |  |  |
|---|---|---|---|---|---|---|---|---|---|
| Comparative Example 10 | — | — | — | — | 3.5 | 65 | 45 | 31 | 13 |
| Example 29 | 160° C. 5 min. | 340° C. 5 min. | 1.6 | 7.2 | — | 85 | 73 | 61 | 25 |

Examples 30 through 32

The woven fabric (A) or felt (A) used in Examples 2 through 20 was impregnated with a mixture of an inorganic colloidal solution having a predetermined concentration and an aqueous dispersion of a fluoropolymer resin having a predetermined concentration and squeezed by a mangle, and the fabric or felt was dried and heat-treated at a predetermined temperature for a predetermined time. The properties of the obtained fabric are shown in Table 7.

TABLE 7

|  | Fabric | Inorganic colloidal solution (concentration) Aq. dispersion of fluoropolymer resin (concentration) | Drying temp. & time | Heat treatment temp. & time | Amount of inorganic oxide & fluoropolymer deposited (%) |
|---|---|---|---|---|---|
| Example 30 | Felt (A) | Colloidal alumina (20%) Polytetrafluoroethylene (2%) | 160° C. 3 min. | 340° C. 5 min. | 14.1% |
| Example 31 | Felt (A) | Colloidal alumina (10%) Tetrafluoroethylene/hexafluoropropylene copolymer (2%) | 160° C. 3 min. | 340° C. 5 min. | 17.1 |
| Example 32 | Woven fabric (A) | Colloidal alumina (18%) Perfluoroalkylacrylate polymer* (4%) | 160° C. 3 min. | 190° C. 3 min. | 11.5 |

|  | Stiffness of treated fabric | | Acid resistance evaluation method (I) Strength retention ratio (%) | | | Acid resistance evaluation method (II) |
|---|---|---|---|---|---|---|
|  | Cantilever method (mm) | Gurley method (mgf) (N) | 10% | 20% | 30% | Breaking time (min.) |
| Example 30 | 8.4 | — | 78 | 61 | 48 | 11.5 |
| Example 31 | — | 10.3 | 85 | 66 | 50 | 4.2 |
| Example 32 | 7.6 | — | 97.2 | 95.3 | 90.1 | 8.6 |

We claim:

1. A chemical resist filter material comprising a fibrous structure made of organic fibers, the fiber surface of which is coated with at least one inorganic oxide selected from the group consisting of oxides of silicon, aluminum and lithium.

2. A chemical-resistant filter material according to claim 1, wherein the fibrous structure is made of an aromatic polyamide fiber.

3. A chemical-resistant filter material according to claim 2, wherein the aromatic polyamide fiber is a polymetaphenylene isophthalamide fiber.

4. A chemical-resistant filter material according to claim 1, wherein the amount of the inorganic oxide deposited on the fibrous structure is in the range of 2 to 40% by weight as solid based on the weight of the fibrous structure.

5. A chemical-resistant filter material according to claim 1, wherein the inorganic oxide applied to the fibrous structure is in the form of a colloidal solution.

6. A chemical-resistant filter material according to claim 1, wherein the inorganic oxide is alumina.

7. A chemical-resistant filter material comprising a fibrous structure, the fiber surface of which is coated with at least one inorganic oxide selected from the group consisting of oxides of silicon, aluminum and lithium, and a fluoropolymer resin.

8. A chemical-resistant filter material according to claim 7, wherein the fibrous structure is made of an aromatic polyamide fiber.

9. A chemical-resistant filter material according to claim 7, wherein the aromatic polyamide fiber is a polymetaphenylene isophthalamide fiber.

10. A chemical-resistant fiber material according to claim 7, wherein the amount of the inorganic oxide deposited on the fibrous structure is in the range of 2 to 40% by weight as solid based on the weight of the fibrous structure.

11. A chemical-resistant filter material according to claim 7, wherein the inorganic oxide applied to the fibrous structure is in the form of a colloidal solution.

12. A chemical-resistant fiber material according to claim 7, wherein the inorganic oxide is alumina.

13. A chemical-resistant filter material according to claim 7, wherein the amount of the fluoropolymer resin deposited on the fibrous structure is in the range of 0.1 to 20% by weight as solid based on the weight of the fibrous structure.

14. A chemical-resistant filter material according to claim 7, wherein the fluoropolymer resin is a polymer having fluorine atoms bonded to the main chain of carbon atoms.

* * * * *